(12) United States Patent
Tarafder et al.

(10) Patent No.: US 10,690,563 B2
(45) Date of Patent: Jun. 23, 2020

(54) SYSTEMS, METHODS, AND DEVICES FOR DETECTING LEAKS IN A CHROMATOGRAPHY SYSTEM

(71) Applicant: Waters Technologies Corporation, Milford, MA (US)

(72) Inventors: Abhijit Tarafder, Franklin, MA (US); Moon Chul Jung, Waltham, MA (US); Jonathan L. Belanger, Whitinsville, MA (US); Xiangjin Song, Westborough, MA (US); Wade P. Leveille, Douglas, MA (US); Darryl W. Brousmiche, Grafton, MA (US)

(73) Assignee: Waters Technologies Corporation, Milford, MA (US)

( * ) Notice: Subject to any disclaimer, the term of this patent is extended or adjusted under 35 U.S.C. 154(b) by 60 days.

(21) Appl. No.: 15/872,755

(22) Filed: Jan. 16, 2018

(65) Prior Publication Data
US 2018/0202888 A1    Jul. 19, 2018

Related U.S. Application Data

(60) Provisional application No. 62/447,234, filed on Jan. 17, 2017.

(51) Int. Cl.
*G01N 30/34* (2006.01)
*G01N 30/02* (2006.01)
*G01M 3/20* (2006.01)

(52) U.S. Cl.
CPC .............. *G01M 3/20* (2013.01); *G01N 30/34* (2013.01); *G01N 30/02* (2013.01); *G01N 2030/027* (2013.01)

(58) Field of Classification Search
CPC ... G01M 3/20; G01N 2030/027; G01N 30/02; G01N 30/34
See application file for complete search history.

(56) References Cited

U.S. PATENT DOCUMENTS

| 2010/0072748 A1 | 3/2010 | Van Pelt | |
| 2016/0116088 A1* | 4/2016 | Graham | B01D 15/10 |
| | | | 285/390 |
| 2018/0094753 A1* | 4/2018 | Leveille | F16L 19/025 |

FOREIGN PATENT DOCUMENTS

| KR | 20150117464 A | 10/2015 |
| KR | 2016 0118779 A | 10/2016 |

OTHER PUBLICATIONS

International Search Report and Written Opinion relating to International Application No. PCT/IB2018/050273, compted on Feb. 27, 2018 and dated Mar. 7, 2018, 9 Pages.

\* cited by examiner

*Primary Examiner* — Brandi N Hopkins
(74) *Attorney, Agent, or Firm* — Womble Bond Dickinson (US) LLP; Deborah M. Vernon; Heath T. Misley

(57) ABSTRACT

Systems, methods, and devices for detecting leaks in chromatography systems are disclosed. A coating is disposed to conform to at least one component of a chromatography system, such as a fitting or a section of tubing. The coating is made of or contains a responsive material that can undergo a detectable change when exposed to a chromatographic fluid or mobile phase. The change of the responsive material can indicate the presence of the fluid or mobile phase, a change in at least one physical property of the coating to prevent passage of the fluid or mobile phase, or a combination thereof.

4 Claims, 4 Drawing Sheets

SYSTEMS, METHODS, AND DEVICES FOR DETECTING LEAKS IN A CHROMATOGRAPHY SYSTEM

RELATED APPLICATIONS

This application claims the benefit of U.S. Provisional Patent Application 62/447,234 filed on Jan. 17, 2017 titled "SYSTEMS, METHODS, AND DEVICES FOR DETECTING LEAKS IN A CHROMATOGRAPHY SYSTEM," the contents of which are incorporated herein by reference in its entirety.

FIELD OF THE INVENTION

The present disclosure generally relates to the detection of fluid leaks in chromatography systems.

BACKGROUND OF THE INVENTION

Chromatography systems perform separations using various fluids and mobile phases flowing through multiple components within the system. For example, solvents under low pressure can be delivered to a pump. The pump can deliver a controlled high pressure mobile phase to a column to effect a separation. The high pressure mobile phase exiting the column can be delivered to a detector for determining the separated components. Chromatography systems also use various other fluids, such as wash solutions and needle washes to clean retained compounds from the system. Chromatography systems also have waste stream(s) to collect the used fluids and mobile phase.

A leak in any one of these flows or streams can be detrimental. A leak in the high pressure mobile phase can interfere with the separation results, e.g., accuracy and reproducibility. A leak in the high pressure mobile phase can also be dangerous. Exposure to solvents can be harmful. Each component within the chromatography system should be sealed in order to prevent leaks and maintain desired pressure and temperature levels within the system. Any leaks in the connecting tubes, fittings, or other components of a chromatography system should be identified and corrected. It can be difficult to detect leaks in chromatography systems, especially chromatography systems with low flow rates where fluid or mobile phase leaks are small.

The present disclosure relates to devices and methods to detect and/or stop leaks in a chromatography system, including small leaks.

SUMMARY OF THE INVENTION

The present disclosure generally relates to systems, methods, and devices for detecting leaks. In particular, the current disclosure provides for a coating that can be placed in contact with or proximal to a component of a chromatography system in order to detect, stop or both detect and stop leaks in the chromatography system.

In one embodiment, the present disclosure relates to an apparatus for detecting or stopping a leak including a coating disposed to conform to a component of a chromatography system, and a responsive material disposed within the coating and configured to respond by creating a physical and/or chemical change when in contact with a fluid or mobile phase. The responsive material can be disposed to change at least one physical or chemical property. For example, the responsive material can be a physically responsive material that changes shape when in contact with the fluid or mobile phase. In another example, the responsive material can be a physically responsive material that becomes stronger or stiffer in order to stop or reduce a leak (e.g., prevent passage of the fluid or mobile phase), in response to being contacted by the fluid or mobile phase. In yet another example, the responsive material can be a chemically reactive material that changes in chemical structure or catalytic nature in response to being contacted by the fluid or mobile phase.

In another embodiment, the present disclosure relates to a method of detecting a leak in a chromatography system including applying a responsive material to at least one component of the chromatography system wherein the responsive material is disposed to change color when in contact with a fluid or mobile phase, to change at least one physical or chemical property, or both.

The various leak detection systems, methods, and devices disclosed can provide a number of advantages over known leak detection systems. For example, the systems, methods, and devices can facilitate identification of leak(s) in a chromatography system. The detected leaks may be smaller in scale than those detectable with conventional leak detection sensors. The systems, methods, and devices can also identify one or more specific areas of a chromatography system where a leak is present, such as when the coating or responsive material is applied to a chromatographic housing or instrument. The systems, methods, and devices can identify the fluid or mobile phase, as well as characteristics of the fluid or mobile phase, leaking. Finally, the systems, methods, and devices can stop or prevent the leak(s) by creating a sealant layer or barrier around a detected leak that can prevent passage of the fluid or mobile phase.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale, and in some instances, various aspects of the inventive subject matter disclosed herein may be shown exaggerated or enlarged in the drawings to facilitate an understanding of different features. In the drawings, like reference characters generally refer to like features, e.g., functionally similar and/or structurally similar elements. The invention will be more fully understood from the following detailed description taken in conjunction with the accompanying drawings, in which.

DETAILED DESCRIPTION

Figure 1:
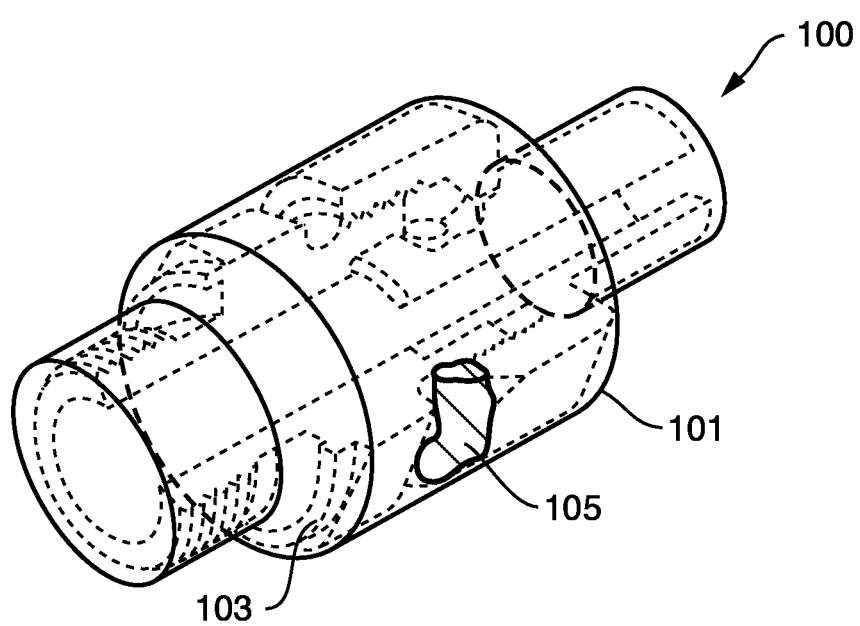
FIG. 1 shows an exemplary coating on an apparatus for detecting, minimizing or stopping a leak.

Certain exemplary embodiments will now be described to provide an overall understanding of the principles of the structure, function, manufacture, and use of the systems, methods, and devices disclosed herein. One or more examples of these embodiments are illustrated in the accompanying drawings. Those skilled in the art will understand that the systems, methods, and devices specifically described herein and illustrated in the accompanying drawings are non-limiting exemplary embodiments and that the scope of the present technology is defined solely by the claims. The features illustrated or described in connection with one exemplary embodiment may be combined with the features of other embodiments. Such modifications and variations are intended to be included within the scope of the present technology. One skilled in the art will recognize that the systems, devices, and methods described herein can be used in numerous contexts and have useful applications outside of the field of chromatography systems. For example, any field where leak detection and prevention is important can potentially benefit from the techniques described herein. For the sake of consistency, the remainder of this application will describe embodiments of the present disclosure in the context of chromatography systems.

Chromatography systems use various fluids, solvents, modifiers, mobile phases, etc. to perform separations via chromatography columns and other system components. These systems can use wash solutions to clean retained compounds from the system. These systems can also have waste stream(s) to collect these various fluids, solvents, mobile phases, etc. after a separation. The different system components including the columns, connecting tubes, fittings, etc. should be properly sealed. Any leaks in the system should be identified and stopped in order for the system to function efficiently. It can be particularly difficult to detect leaks in micro-fluidic chromatography systems due to low flow rates of the mobile phase.

The chromatography systems can include, but are not limited to, liquid chromatography, gas chromatography, supercritical fluid chromatography, carbon dioxide based chromatography in nanoscale, microscale, analytical scale, and prep scale.

The components of these chromatographic systems that can be coated (or otherwise treated) include tubing, fittings, connectors and various system components, e.g., pump, column, column case, column heater, detector. Any type or size tubing can be coated including 10 µm-100 mm. Any type or size fitting, connector, and fluidic devices appropriate for the above tubing size can be coated.

In exemplary embodiments, the leak detection device, e.g., coating or contact material, can be used in connection with connecting tubes, fittings, or fluidic devices commonly used in chromatography systems. In some embodiments, the coating can be a wrap, a sleeve, a material that is applied or sprayed onto a component, a material that at least partially contacts or conforms to a component, a material that is placed in close proximity to a component, etc. The various components can be made of metallic or non-metallic materials, such as stainless steel, titanium, alloys, brass, ceramics, glass, fused silica, silicon, plastics (e.g., acrylonitrile butadiene styrene (ABS), polyvinyl chloride (PVC), high impact polystyrene (HIPS), HDPE, LDPE, PP, PETE, PEEK, Teflon), viscous liquids, etc.

The system components, e.g., pump, column, column case, column heater, detector, themselves can be coated, or otherwise treated. Alternatively, the bottom, corners, or sides of the component, e.g., pump, can be coated, or any opening where leaked fluid or solvent may exit the component.

The pressure of the flows or streams in the chromatography system can be, at times, lower than atmospheric pressure, e.g., when a vacuum is created within the system. The pressure can be, at times, high. Low pressure can occur before the pump. High pressure can be after the pump and through the column. The pressures of the chromatography system can be 0, 10, 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500 or 150000 psi. These values can define a range, such as about 100 psi to about 20,000 psi.

In some embodiments, leaks can be detected, and/or stopped, in systems with flow rates of about 1 nL/min, 0.01 µL/min, 0.05 µL/min, 0.1 µL/min, 0.5 µL/min, 1 µL/min, 5 µL/min, 10 µL/min, 50 µL/min, 100 µL/min, 500 µL/min, 1 mL/min, 5 mL/min, 10 mL/min, 50 mL/min, 100 mL/min, 500 mL/min, or 1 L/min.

Additionally, a leak may be difficult to detect because the fluid, solvent or mobile phase evaporates before accumulating sufficient volume to visibly pool or drip from the component. Prior leak detection techniques use sensors that need significant volumes of leaked fluid to operate. These techniques often cannot detect smaller scale leaks or vapor leaks. The coating of the present disclosure can be placed directly on or in close proximity of the potential leak, e.g., fitting, connector. The direct placement or close proximity of the coating can identify a leak prior to significant evaporation, pooling or dripping. The coating can be placed directly on the components, e.g., fitting, connector, or can be placed within about 0.01 mm, 0.05 mm, 0.1 mm, 0.5 mm, 1.5 mm, 1.0 cm, 5.0 cm, or about 10.0 cm from the component or the site of future leak. These values can be used to define a range, such as about 0.01 mm to about 10 mm. In some embodiments, the coating can be made of a flexible or pliable material that can conform to one or more components of a chromatography system.

According to embodiments of the present disclosure, a leak detection device is disclosed that contains a responsive material and can be coated or wrapped around one or more components of a chromatography system. In some embodiments, the coating is the responsive material such that the entirety or bulk of the coating is the responsive material. In other embodiments, the responsive material is a component of the coating. For example, the coating can include about, or less than about, or more than about, 1%, 5%, 10%, 15%, 20%, 25%, 30%, 35%, 40%, 45%, 50%, 55%, 60%, 65%, 70%, 75%, 80%, 85%, 90%, 95%, or about 99% of the responsive material or materials. These values can be used to define a range, such as about 20% to about 80%. When a leak occurs through any portion of the so coated or wrapped chromatography system, such as the connecting tubes or fittings, the leaking fluid can trigger a response from the responsive material in the leak detection device, producing a change in the material, for example, a change that can be detected through external means. The coating can contain other components, including adhesives, matrices, structural elements, embedded components, etc.

In one embodiment of the present disclosure, the responsive material can respond differently depending on the fluid or solvent that leaks and makes contact with the responsive material. Thus, a change in the responsive material can also indicate what type of fluid or solvent is leaking. A number of different types of solvents may be used within a chromatography system. For example, systems may require one, two, or more mobile phase supplies, strong and weak wash solutions, or cleaning and rinse solutions, and may require additional fluids for maintenance purposes. The responsive material can be designed to indicate differences between various fluids or solvents, including differences in pH, aqueous content, organic content, ionic strength, functional groups (e.g., amines, aldehydes, etc.), aromaticity, evaporation energy, polarity, etc. In one embodiments, the responsive material can indicate which fluid is leaking by means of a specific color change. For example, in a system using two different solvents, solvent A and solvent B, a responsive material can be selected which responds to solvent A by changing its color from red to blue, but an interaction with solvent B results in no such color change.

To address a leak of fluid, e.g., aqueous or semi-aqueous fluid, the responsive material can include a highly absorbent material, such as a hydrogel, silica gel, Drierite® (color-indicating variant of calcium sulfate), magnesium sulfate, hygroscopic compounds, etc. In some embodiments, the responsive material can include a material, such as a hydrogel or other polymeric material(s), that can be cross-linked or polymerized when exposed to a leaked fluid. In some embodiments, the responsive material may swell, or otherwise change in state, stiffness, moldability and/or otherwise prevent passage of fluid or mobile phase, in order to act as a sealant for a detected leak.

In other embodiments, the responsive material can be a water soluble material, a polar solvent soluble pigment, or a non-polar solvent soluble pigment. Any shapes or patterns printed with the pigments will be moved with the spread of the compatible fluid to change the appearance (smearing) or location (simple movement), thus indicating the presence of the leak and the identity of the leaked liquid. One example of such an embodiment is described below in reference to FIGS. 4-5. In other embodiments, leaked fluid transports one reactant to another reactant to initiate a chemical reaction that may create an easily detectable product.

To indicate a leak wherein the pH of the leaking fluid or solvent can be indicated, the responsive material can include a pH indicator, such as litmus. For example, if the leak detection device is coated with a coating containing litmus, or some other halochromic material, a solvent with specific pH ranges can change the color of the device at the leaking point.

In some embodiments, a color change of the responsive material, or coating containing the material, can be permanent. The color change can also change from one color to a second color. Depending on the severity of the leak, the coating/material can also change to a third (or more) color as an indication of the magnitude of the leak. The color change can have various degrees of intensity. The intensity of the color change can also indicate the magnitude of the leak.

In some embodiments, a change in state of the responsive material can be reversible. For example, the responsive material may regenerate when exposed to a particular solvent or fluid. In some embodiments, a change in the responsive material can be reversed by flushing or otherwise exposing the responsive material to a neutralizing chemical. One example of a reversible leak detection scheme could employ the use of a desiccant, such as calcium sulfate impregnated with cobalt(II) chloride, that changes colors between blue and pink when liquids are detected. Nitrogen drying can return the indicator to its original color. Another example of a reversible detection technique involves the use of thermo-chromic materials that change color in response to changes in temperature. A detectable temperature change can happen, for example, as a result of solvent evaporation, and the thermo-chromic material can return to its default color after the temperature change. Yet another example of a reversible detection technique involves the use of hydrogel forming materials that swell upon exposure to fluid. The hydrogel material can be returned to a dry state when the leak is stopped.

The color change can be visually detectable, or be detectable by other detection mechanisms. Examples of visually detectable changes include a color change, a change in size or thickness, a change in clarity or opacity, a foaming action, a dissolving or disintegrating reaction, etc. In some embodiments, a change in the responsive material can be detected via electromagnetic waves of various wavelengths in the range of 1 pm to 100 m, such as gamma rays, X-rays, ultraviolet (UV), visible light, infrared (IR), microwaves, radiowaves, etc. Other example detection techniques can employ water soluble inks or fluorescent inks that are detectable using a black light. Such techniques allow for detection of even minor leaks, including leaks in vapor form, in the connecting tubes or components of a chromatography system. In some examples, detection can be automated using one or more cameras installed in strategic locations. In such examples, the camera or cameras can perform a wide range of detection, including IR and UV detection. A system including a camera or cameras taking images repeatedly and an imaging processor can detect the changes in physical appearance, such as shape, color, volume, area, in a time-dependent manner. The changes over time provides information about the rate of fluid leak. When system components are replaced, new tubing or components can come with fresh responsive coatings applied to them. Other sensors, including sensors capable of measuring the conductivity of a coating, the weight of a coating, the thickness of a coating, etc., could also be used to detect various responses of the coating.

The choice of material, weight percent, thickness, etc. can affect the sensitivity and dynamic range of the coating. The coating can be applied to a component at various thicknesses. The thickness of the coating can be 1.0 nm, 5.0 nm, 10 nm, 50 nm, 100 nm, 500 nm, 1.0 µm, 5.0 µm, 10 µm, 50 µm, 100 µm, 500 µm, 1.0 mm, 5.0 mm, or 10 mm.

In other embodiments, the coating of the present disclosure can be used to stop or seal a detected leak. The responsive material can be designed to change at least one chemical or physical parameter, e.g., become more stiff, in response to contact by a fluid. An increase in stiffness, for example, can perform a sealing function to seal a detected leak in the chromatography system.

To seal a leak wherein the fluid contains an aqueous solution, the responsive material can include an absorbent material such as a hydrogel, a water-curable material, or other suitable water-responsive material.

In exemplary embodiments, the responsive material can respond to aqueous and organic solvents, including water, methanol, ethanol, acetonitrile, propanol, tetrahydrofuran, dimethoxyethane, chlorobutane, dichlorobenzene, pentanone, acetone, chloroform, cyclohexane, diethyl ether, ethyl acetate, pentane, hexane, heptane, toluene, and combinations or mixtures thereof. The responsive material can also include acids and bases, including formic acid, acetic acid, trifluoroacetic acid, ammonia, amines, and combinations or mixtures thereof.

In exemplary embodiments, the responsive material in the coating can respond differently based on the solvent or rinse solution used in the chromatography system. For example, the responsive material can be configured to undergo a first change in response to a first solvent and undergo a second change in response to a second solvent. In this way, the leak detection device provides an indication that a leak is present, and also indicates what type of substance is leaking. In other embodiments, the responsive material can be primed to only respond to a particular chemical or type of chemicals.

In exemplary embodiments, the leak detection device can be made of rigid materials, as long as a leaking solvent, either in liquid or vapor form, can be absorbed on a surface of the leak detection device. In some embodiments, a change in the responsive material can be reversed by flushing or otherwise exposing the responsive material to a neutralizing chemical.

In another embodiment of the present disclosure, the leak detection device can be a sleeve or strip made of a flexible material that can be applied to or tightly wrapped around a portion of a component used in a chromatography system. The sleeve can be made of a responsive material or can contain a responsive material that undergoes a detectable change when exposed to a fluid. In another example embodiment, the leak detection device is a coating that can be applied to at least a portion of a component used in a chromatography system. The coating can be made of or include a responsive material that undergoes a detectable change when exposed to a fluid. The sleeve, strip, or coating can be applied to the component in various ways in order to detect a leak in a system including the component. For example, the leak detection device can be applied to the component using an adhesive material, or the leak detection device can be a coating that is applied to the device like paint. For example, the coating and/or responsive material can be applied by spray application.

In some embodiments, the liquids that can be detected can be broken down into two general groups. These groups include aqueous (acids, bases, neutrals) and organic solvents (polar and non-polar). Multiple stripes or coatings containing different indicator materials for detecting leaks of aqueous solutions or organic solvents can be placed on components of a chromatography system. In some examples, different coatings, tapes or strips containing responsive materials configured to detect the presence of polar solvents, non-polar solvents, and/or aqueous solutions can be applied to components or regions within a chromatography system. The responsive material can be located, for example, on the outer diameter of sections of tubing of a chromatography system or on the inner diameter of heat-shrink tubing sleeves. The responsive material can be applied as thin lines, strips, dots, or any other suitable configuration. In some embodiments, the responsive material can be included in a polymer coated tubing which isolates a stainless steel tube, and the responsive material could dissolve or disintegrate, thus effecting tube conductivity.

FIG. 1 shows an apparatus 100 for detecting a leak, according to an embodiment of the present disclosure. As can be seen in this embodiment, the apparatus 100 includes one or more chromatography components 103, which are covered by a coating 101 that includes a responsive material. The coating 101 can cover the entirety of one or more of the components, or the coating 101 can cover strategic portions of one or more of the components, e.g., 103. In this particular embodiment, the responsive material is configured to change in color when exposed to a fluid, and a darkened portion 105 of the coating 101 indicates that there is a leak in the chromatography system at or near darkened portion 105. In some embodiments, the size and/or darkness of the darkened portion 105 indicates the severity or size of the leak. Similar to litmus paper, the coating 101 can undergo a color or appearance change detectable by a UV light source, for example, when exposed to fluid.

In various embodiments, the apparatus 100 can be operated online, offline, or both. For online operation, the responsive coating 101 can be responsive to one or more of the solvents that can be used during a regular chromatographic operation. In such an embodiment, any leaking solvent will respond to the responsive coating 101 and indicate the presence of a leak. For offline operation, the responsive coating 101 can be responsive to a leak detection reagent. In such an embodiment, the system can be flushed with a reagent, such as one with a lower viscosity and/or surface tension that is more prone to leaking from a system, and the responsive coating 101 can be scanned for any change that can indicate a leak. As discussed above, the responsive coating 101 can change in color in response to being exposed to a fluid.

Alternatively, the responsive coating 101 can be made to harden, or otherwise physically change, upon contact with a fluid. In such cases, the responsive coating 101 can harden, etc. to form a sealant layer around a detected leak.

In exemplary embodiments, the responsive coatings of the present disclosure, e.g., 101, can be applied using various techniques, including using an adhesive, painting, powder coating, baking, or other deposition methods. Exemplary deposition techniques can be used to apply a responsive coating, e.g., 101, on various diameters of tubing or components, including small components where visible detection would no longer be applicable.

Figure 2:
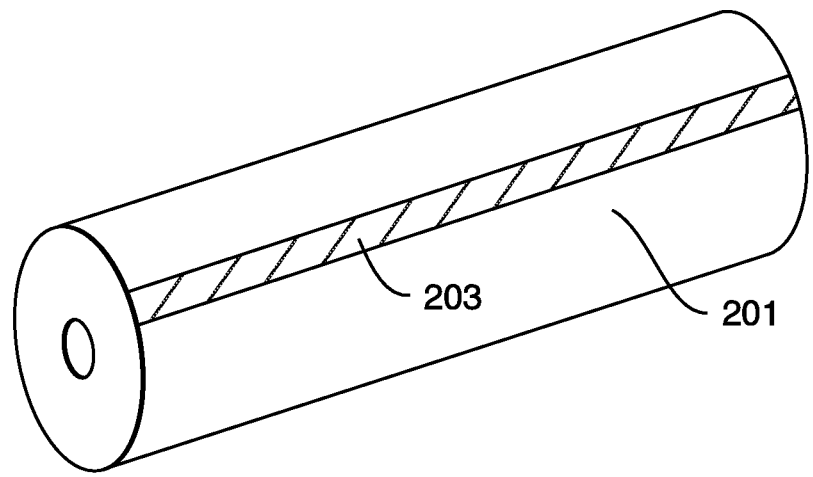
FIG. 2 shows an exemplary perspective view of a responsive coating applied to a portion of a tube.

FIG. 2 shows a perspective view of a responsive coating 203 applied as a strip on the outside portion of a tube 201, according to an embodiment of the present disclosure. As discussed above, the leak detection device can be a responsive coating 203 and can be used to coat all or a portion of the connective tubing 201 of a chromatography system. In this exemplary embodiment, the connecting tube 201 can be produced with a continuous strip of a responsive coating 203 along the length of the tube 201. Similar to litmus paper, the coating 203 can undergo a color or appearance change when wetted or exposed to a fluid. In exemplary embodiments, the change in the responsive coating can be detected visually or by a UV light source. In one embodiment, the coating applied to the length of the tubing can detect a leak anywhere along the entire length, including where the leak occurs. In some embodiments, all or substantially all of the tubing in a chromatography system uses tubing having leak detection capability, e.g., a strip. If insufficient amounts of the leaked fluid remains present at the point of the leak, the leak can still be identified if the section of tubing at the lowest point (where the leak may travel to and accumulate) is so coated. In some embodiments, the tubing can have multiple strips of different coatings so that different leaked fluids can be independently sensed.

Figure 3:
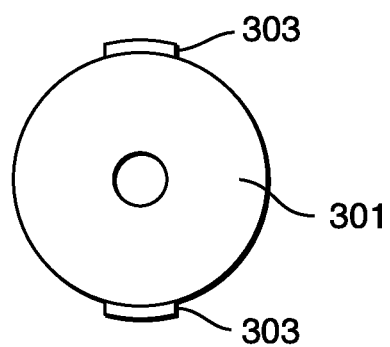
FIG. 3 shows an exemplary cross sectional view of two portions of responsive coatings applied to a portion of a tube.

FIG. 3 shows a cross sectional view of two responsive coatings 303 applied to a portion of a tube 301, according to an embodiment of the present disclosure. As discussed above, the leak detection device can include more than one responsive coating 303 and can be used to coat all or a portion of a connective tube 301 of a chromatography system. In this exemplary embodiment, the tube 301 can be produced with two responsive coatings 303, or strips, along the length of the tube 301 on opposing portions of the tube 301.

Figure 4:
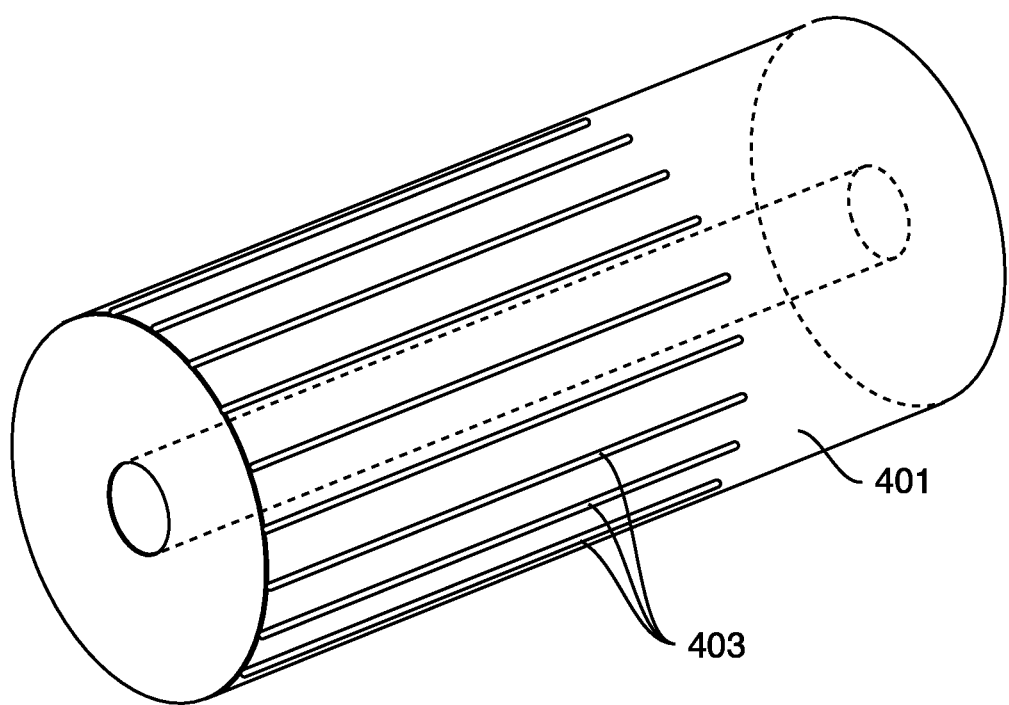
FIG. 4 shows an exemplary perspective view of a responsive coating applied in lines to a portion of a tube.

FIG. 4 shows an exemplary perspective view of a responsive coating applied in lines 403 to a portion of a tube 401, according to an embodiment of the present disclosure. As will be appreciated, the responsive coating can be applied to the tube 401 as lines, dots, or other geometric shapes, to all of or a portion of a connective tube 401. In some embodiments, lines 403 of the responsive coating may be short in length or be applied for the entire length of the tube. The various lines 403 can be configured for one type of detection (solvent, water, etc.) or may vary line to line, to detect leaks of acids, bases, water, etc. For example, four of the lines 403 could be configured to detect leaks of water, four of the lines 403 could be configured to detect leaks of a solvent, and four lines could be configured to detect leaks of an acid.

Figure 5:
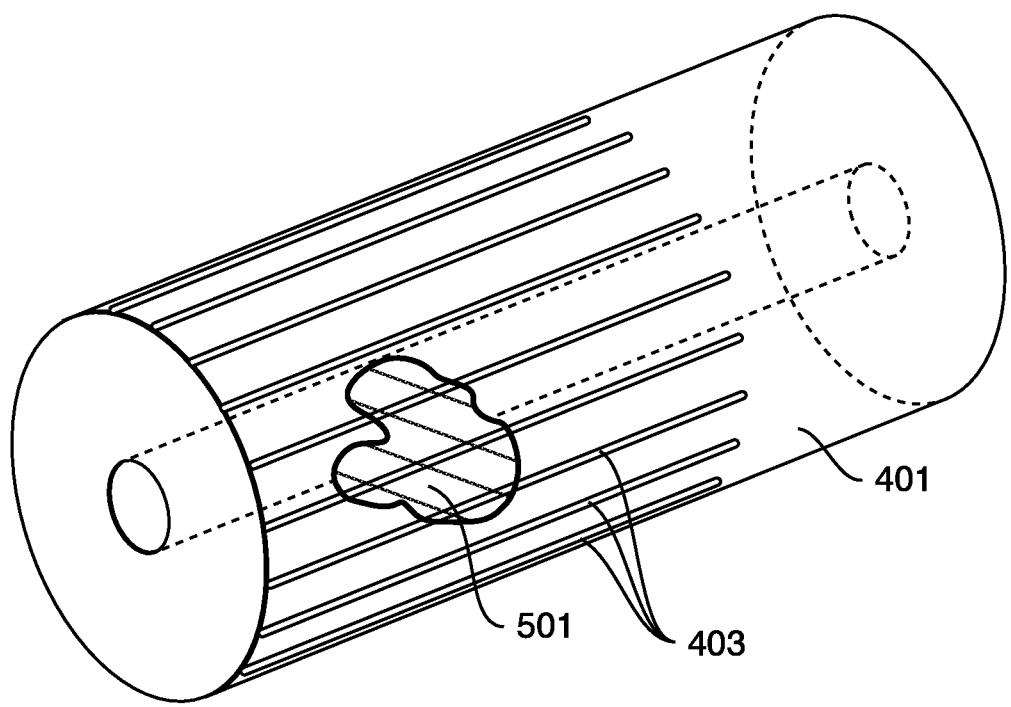
FIG. 5 shows an exemplary perspective view of the tube of FIG. 4, where a smear shows the detection of a leak on a portion of the tube.

FIG. 5 shows an exemplary perspective view of the tube 401 of FIG. 4, according to an embodiment of the present disclosure. In this particular example, the responsive coating is applied to the tube 401 in the form of a number of lines 403, as discussed above, and a smear 501 in the lines 403 shows the detection of a leak on a portion of the tube 401. In this particular embodiment, a leak in the tube 401 can smear the lines 403 at or near the location of the leak, thus facilitating identification of a leak.

One of ordinary skill in the art will appreciate further features and advantages of the present technology based on the above-described embodiments. Accordingly, the invention is not to be limited by what has been particularly shown and described, except as indicated by the appended claims. All publications and references cited herein are expressly incorporated herein by reference in their entirety.

What is claimed is:

1. An apparatus for stopping a leak in a chromatography system comprising:
   a coating disposed to conform to a component of a chromatography system; and
   a responsive material disposed within the coating wherein the responsive material is disposed to increase stiffness in response to being contacted by the fluid.

2. An apparatus for stopping a leak in a chromatography system comprising:
   a coating disposed to conform to a component of a chromatography system; and
   a responsive material disposed within the coating, wherein the responsive material includes a hydrogel.

3. A method of stopping a leak in a chromatography system comprising:
   applying a responsive material to at least one component of the chromatography system wherein the responsive material is disposed to increase stiffness in response to being contacted by the fluid.

4. The method of claim 3, wherein the responsive material includes a hydrogel.

* * * * *